E. SEVERINE.
DRESSMAKING TOOL.
APPLICATION FILED JAN. 28, 1918.
1,285,423.
Patented Nov. 19, 1918.
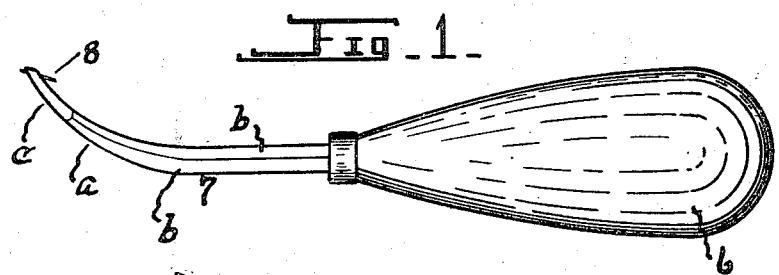
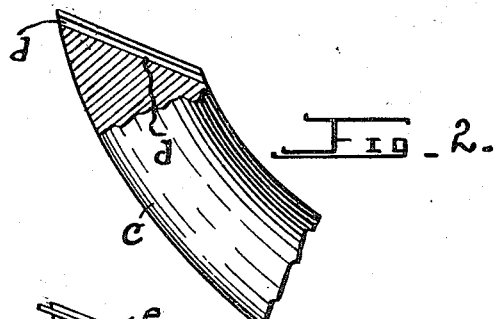
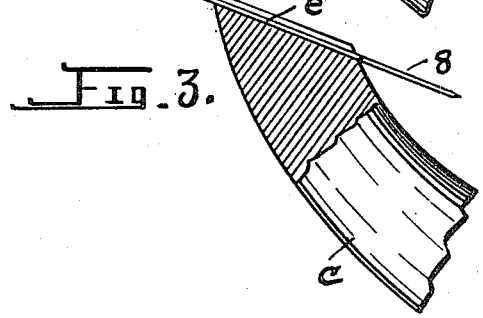
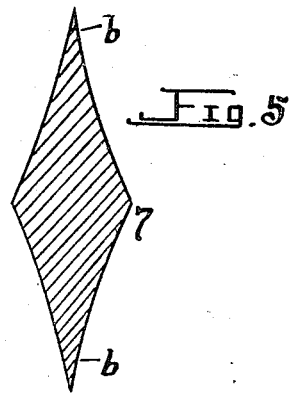
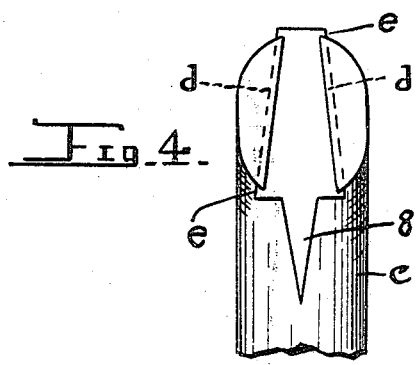
Inventor
Ethel Severine,
By Hiram A. Sturges,
Attorney

UNITED STATES PATENT OFFICE.

ETHEL SEVERINE, OF GRESHAM, NEBRASKA.

DRESSMAKING-TOOL.

1,285,423.  Specification of Letters Patent.  Patented Nov. 19, 1918.

Application filed January 28, 1918. Serial No. 214,143.

*To all whom it may concern:*

Be it known that I, ETHEL SEVERINE, a citizen of the United States, residing at Gresham, in the county of York, and State of Nebraska, have invented certain new and useful Improvements in Dressmaking-Tools, of which the following is a specification.

This invention relates to a tool useful for dressmakers, to cut and remove threads from the seams of fabrics and to remove basting-threads, and has for its object to provide a small implement which will be convenient in use for these purposes, and to consist of parts so arranged that manufacture will be practical and economical.

The invention consists of the novel construction, combination and arrangement of parts as described herein and claimed, and as illustrated in the accompanying drawing, wherein,—

Figure 1 is a side view of the device. Figs. 2, 3, 4, and 5 are detail views, on an enlarged scale, to clearly show construction, Figs. 2 and 3 being side views showing a terminal part of the blade-member, partly in section. Fig. 4 is a plan view of the terminal of the curved blade-member, to clearly show the mounting of a tooth employed. Fig. 5 is a transverse section through the blade.

Referring now to the drawing for a more particular description, numeral 6 indicates a conventional handle in which is mounted a blade-member 7 provided with an outwardly convergent, curved terminal $a$, the end of said part $a$ being provided with a tooth 8 which projects at an acute angle to the longitudinal axis of the blade, inwardly or toward the handle of the implement, knife-edges $b$ being provided for said blade-member said edges $b$ extending, preferably, from the handle to terminate adjacent to the tooth 8, that part $c$ near said terminal, preferably being substantially circular in cross-section.

The implement thus described is at all times convenient in use, and in the work of removing threads from fabric, the threads which could be grasped by the fingers of an operator only with inconvenience, may be readily caught by the tooth, or caught between the tooth and the part $c$ for removal, the blade being used in many instances for cutting the threads to be removed, the principal advantage in the use of the device being a saving of time and work of an operator.

While I have shown member 7 to be provided with two knife-edges $b$, one of said edges may be omitted if desired, and said member 7 may have such a degree of curvature as may be found to be of advantage.

It will be appreciated that in manufacturing the device, it would be difficult to provide a tooth disposed transverse to the axis of and integral with the part $c$ of the blade-member, and therefore grooves $d$ are formed in the end of the part $c$ for receiving the outwardly convergent edges $e$ of the body of the tooth, and if the tooth is broken by inadvertence or otherwise, another tooth may be readily inserted, this obviously being a great advantage, said tooth being practically inexpensive since it may be constructed of sheet metal, and on account of its convergent edges may be conveniently mounted in a manner to be retained in the grooves.

Having described my invention, what I claim and desire to secure by Letters Patent is,—

In a dressmaking tool, a single blade-member having a handle, said blade-member being provided adjacent to its outer end with a cylindrical part having a terminal facet provided with a channel having undercut, outwardly convergent walls and disposed at an acute angle to the longitudinal axis of the blade member with an inclination toward the handle, a rectilinear, convergent plate having a terminal projection at its medial line and adapted to be disposed in engagement with the undercut walls of the facet with its projection extending in a direction of said handle, that part of the blade between its cylindrical part and the handle being curved outwardly in one direction and having opposed cutting edges.

In testimony whereof, I have affixed my signature in presence of two witnesses.

ETHEL SEVERINE.

Witnesses:
C. F. MOLME,
J. W. WILSON.